United States Patent [19]
Bortolini

[11] Patent Number: 5,992,488
[45] Date of Patent: Nov. 30, 1999

[54] FLANGING AND TRIMMING MACHINE OF PANELS

[75] Inventor: Francesco Bortolini, Miane, Italy

[73] Assignee: Bortolini Engineering, S.N.C. Miane, Italy

[21] Appl. No.: 08/809,348

[22] PCT Filed: Aug. 2, 1996

[86] PCT No.: PCT/EP96/03410

§ 371 Date: Mar. 21, 1997

§ 102(e) Date: Mar. 21, 1997

[87] PCT Pub. No.: WO97/05993

PCT Pub. Date: Feb. 20, 1997

[30] Foreign Application Priority Data

Aug. 4, 1995 [IT] Italy ................................ TV 95A0099
May 3, 1996 [IT] Italy ................................ TV 96A0058

[51] Int. Cl.[6] ....................................................... B32B 31/00
[52] U.S. Cl. ......................... 156/351; 156/353; 156/356; 156/358; 156/360; 156/447; 156/448; 156/468; 156/475; 156/522; 156/552
[58] Field of Search ..................................... 156/447, 448, 156/459, 468, 475, 522, 552, 572, 350, 353, 356, 358, 351, 360

[56] References Cited

U.S. PATENT DOCUMENTS 3,655,479  4/1972  Helmes et al. ........................... 156/212
4,696,714  9/1987  Voorhees ................................. 156/468

Primary Examiner—Richard Crispino
Assistant Examiner—Linda L. Gray
Attorney, Agent, or Firm—Bucknam and Archer

[57] ABSTRACT

A flanging-trimming machine for differently shaped panels having peripheral edges. The machine covers the edges with an irremovable covering strip applied using an adhesive. The machine includes (a) a main supporting structure, (b) a reservoir having the adhesive therein, (c) a means for supporting, transporting, and positioning said panels which is displaceable with a rectilinear reciprocating movement along a first horizontal and longitudinal axis X and a second horizontal and traversal axis Y which is orthogonal to the axis X and which is displaceable with a rotational reciprocating movement along a third axis W which is orthogonal to the axes X and Y, (d) a preassembled spool of the material for the strips, (e) a means for applying the strips to the edges which is associated with a means to dispense the strips and which is adapted to apply the adhesive to the edges and thereafter to apply the strips to the edges, (f) a cutting means for cutting the strips to the proper size, (g) a trimming means for trimming along the strips after application, and (h) a scraping means for finishing the surface of the strips after application.

22 Claims, 15 Drawing Sheets

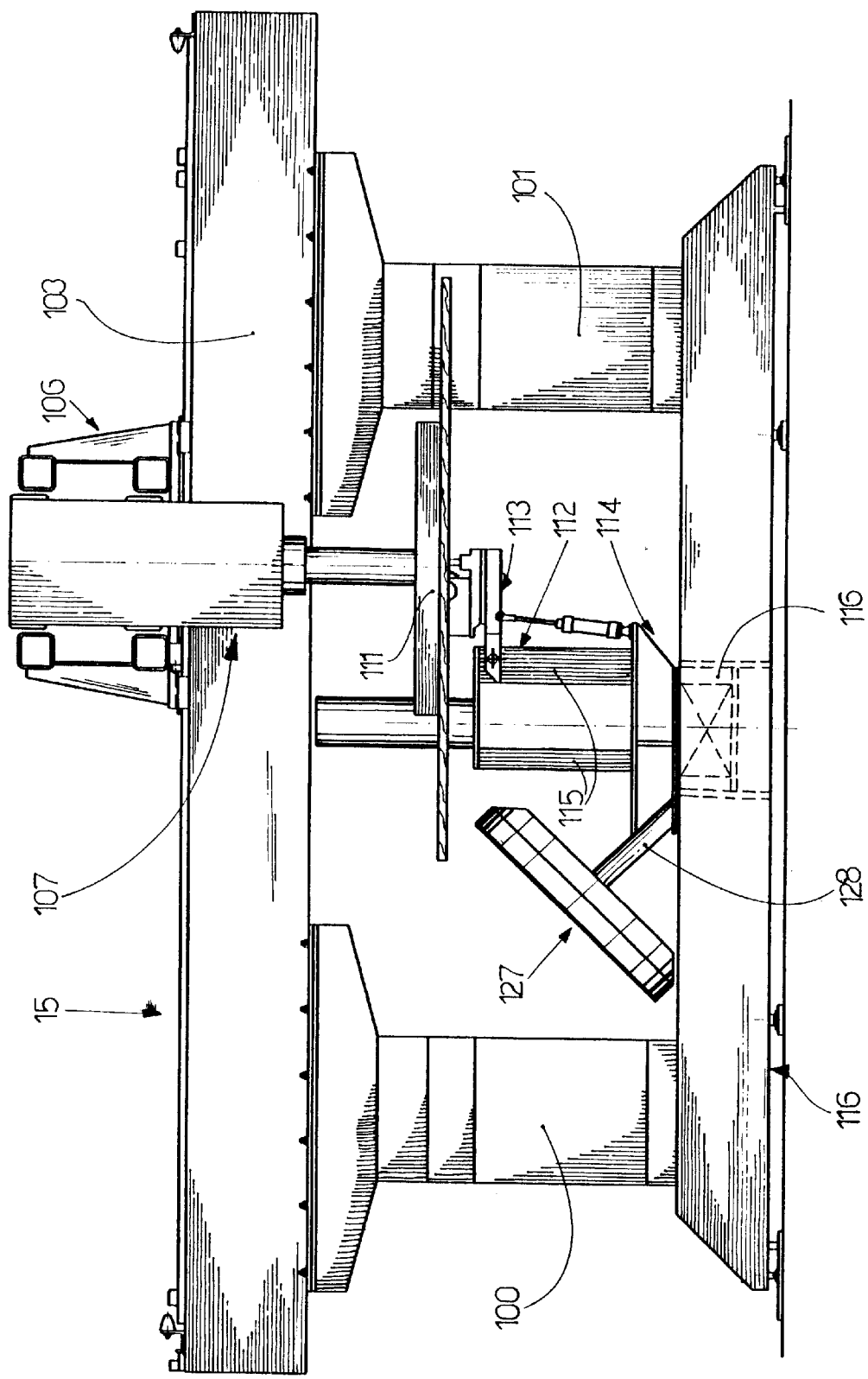

FLANGING AND TRIMMING MACHINE OF PANELS

FIELD OF THE INVENTION

The machine relates to a flanging and trimming machine of panels, adapted to apply irremovably a plurality of covering strips having the requested aesthetical appearance against the peripheral edge of the same panels.

BACKGROUND OF THE INVENTION

Flanging machines of the kind referred to are known for applying irremovably covering strips against the corresponding peripheral edges of differently shaped panels made of wood, chip wood, plastic and similar materials, into which the panels to be coated along the edges are arranged, which panels are prepared and cut in advance with the pre-established shapes and sizes by means of machining steps performed with operative machines of conventional type, and such panels are progressively coated along their peripheral edges by corresponding covering strips made of wood, plastic or other suitable materials, in such a way that they are fixed against such edges without the possibility to disjoin therefrom.

In order to perform this, these covering strips are coated in advance with suitable adhesive materials such as for instance thermomeltable glues of conventional type onto the surface thereof to be fixed against said peripheral edges, which operation is normally performed in a particular operative station of the machine and consists in drawing by a roll the adhesive material contained into a proper reservoir and transferring such adhesive material onto the surface of the strips to be applied against the different peripheral edges of each panel, by means of contact of such roll against the surface referred to, and afterwards the strips so coated with adhesive material are pressed by an additional machine pressing roll against the peripheral edges of each panel, thereby providing a close irremovable junction therewith.

Such covering strips may be also pre-coated with adhesive materials on other areas of the processing factory, so that these strips so arranged in the flanging machines referred to are firstly heated at temperatures enough to soften the same adhesive materials, and thereafter fixed as described above against the peripheral edges of each panel.

However, the flanging machines of the kind described have evident applicative limits, ascribable above-all to the fact that they are able to perform satisfactory flanging operations of panels with rectilinear outlines only and not with curvilinear and mixed rectilinear-curvilinear outlines, as it would be desirable, since such machines are designed to machine only along Cartesian axes X and Y, which are rectilinear and orthogonal to each other, and therefore cannot perform machinings along bent lines, so that in presence of such profiled panels the flangings thereof cannot be performed automatically with such machines, and must be performed exclusively manually, with consequent drawbacks from the points of view of a lower flexibility and highest burdens in the manufacture of these kinds of panels.

SUMMARY OF THE INVENTION

The present invention has the object to overcome the above mentioned drawbacks and applicative limits of-the present flanging machines, by means of a flanging-trimming machine of shaped panels adapted to provide for automatically the flanging of panels having different outlines, with rectilinear, curvilinear and mixed curvilinear-rectilinear outlines, thereby ensuring a remarkable productive versatility and flexibility thereof.

In another embodiment, it is also provided a flanging-trimming machine made with constructive and operative characteristics which are slightly different and such that to improve the productive performances of the same machine.

This machine is made with the costructive characteristics substantially described, with particular reference to the attached patent claims.

BRIEF DESCRIPTION OF THE DRAWINGS

The invention will be better understood by the following description, given solely by way of not-limiting example and with reference to the accompanying drawings, wherein:

FIG. 14 schematically shows some outlines of shaped panels which can be machined with the machine according to the invention;

FIG. 15 schematically shows a front view of a flanging-trimming machine of panel according to the invention, in a third embodiment thereof;

In the Figures referred to it is schematically illustrated a flanging-trimming machine 15 of differently shaped panels made of wood, plastic material and similar materials, in order to provide for coating the peripheral edges of said panels by means of corresponding covering strips having the desired shape and aesthetical appearance, which are joined irremovably against such peripheral edges in the manner hereinafter described.

Figure 1:
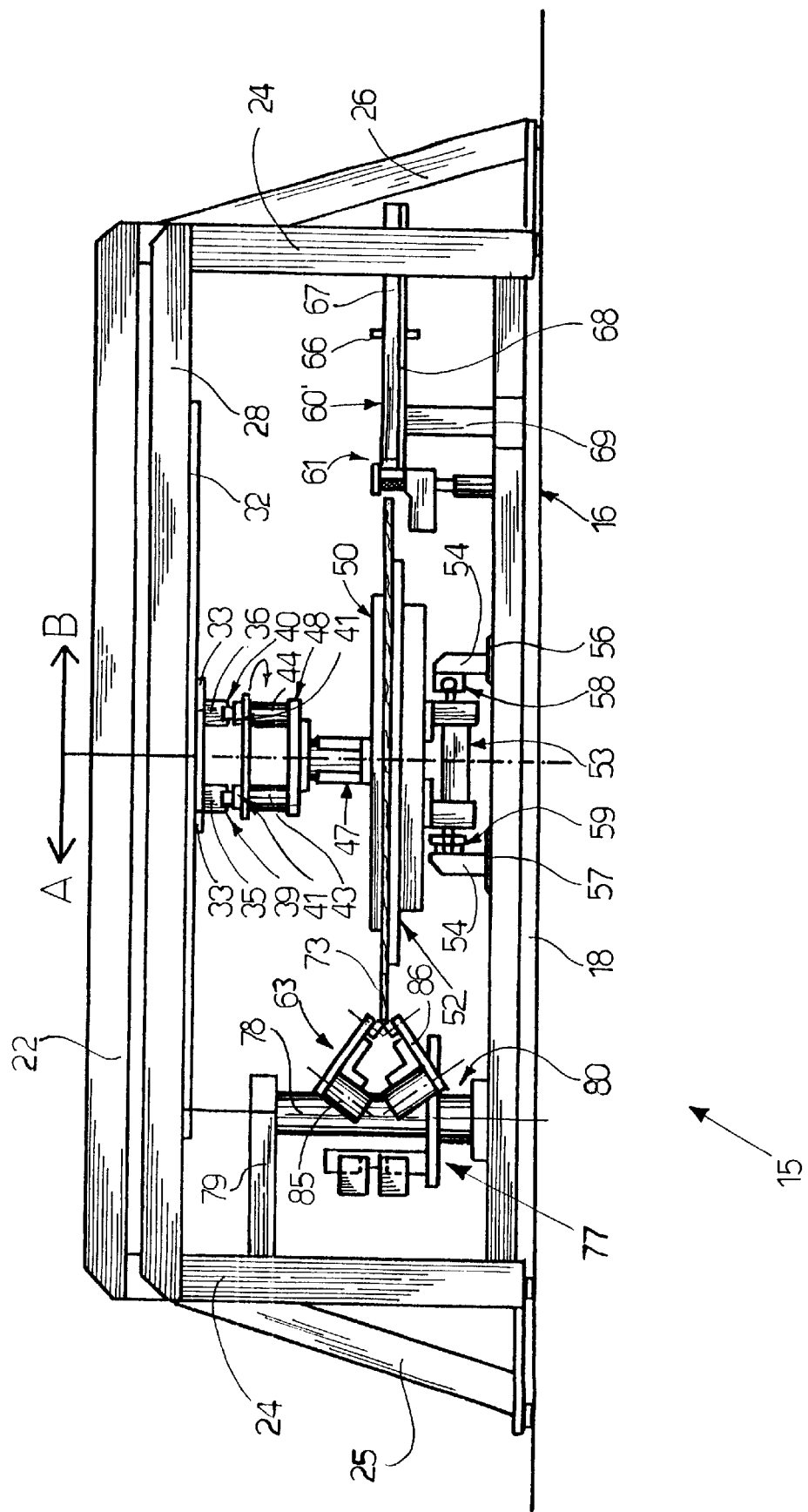
FIG. 1 schematically shows a front view of a flanging-trimming machine of panels according to the invention, in a first embodiment thereof.
Figure 2:
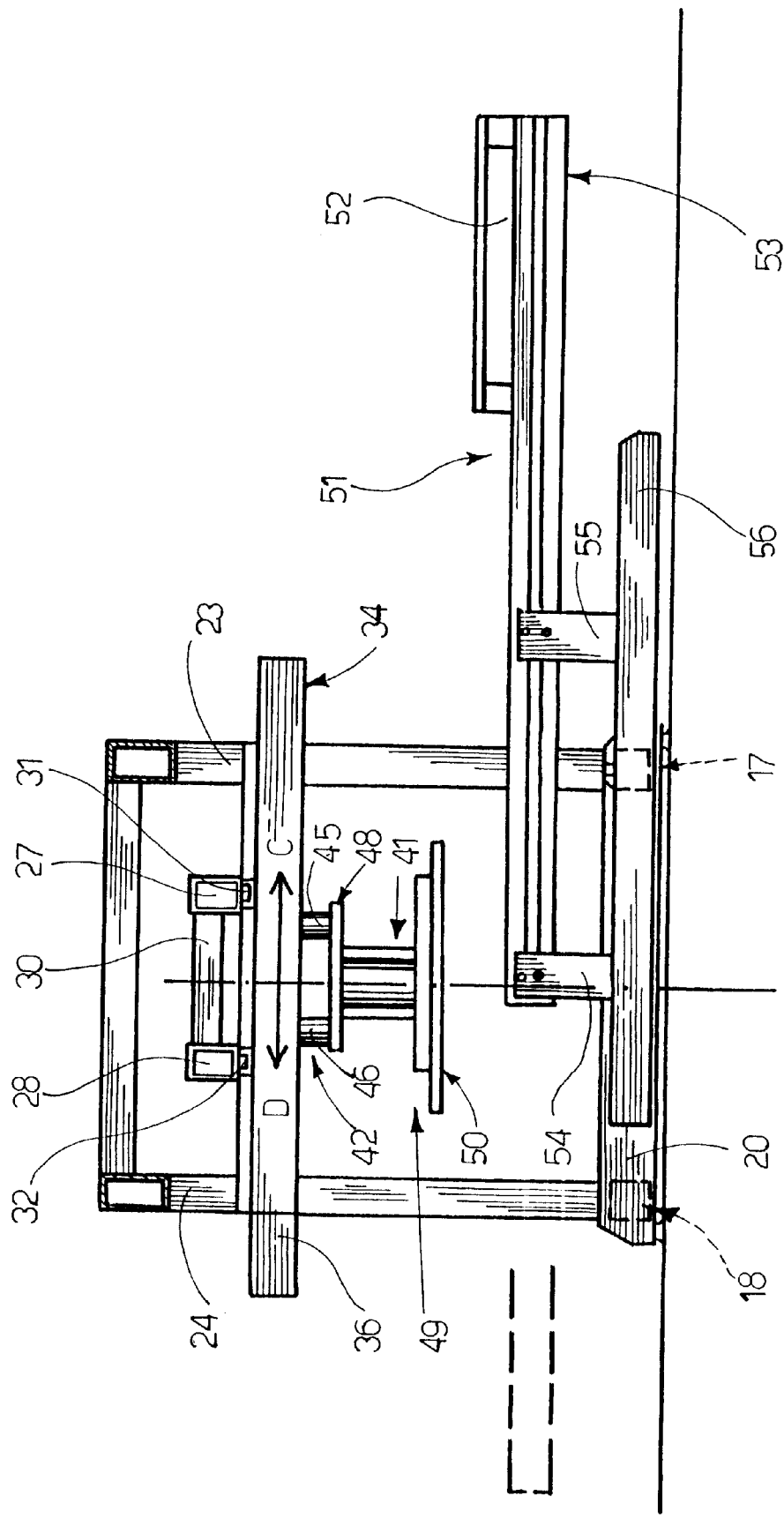
FIG. 2 schematically shows a side view of the flanging-trimming machine of FIG. 1.
Figure 3:
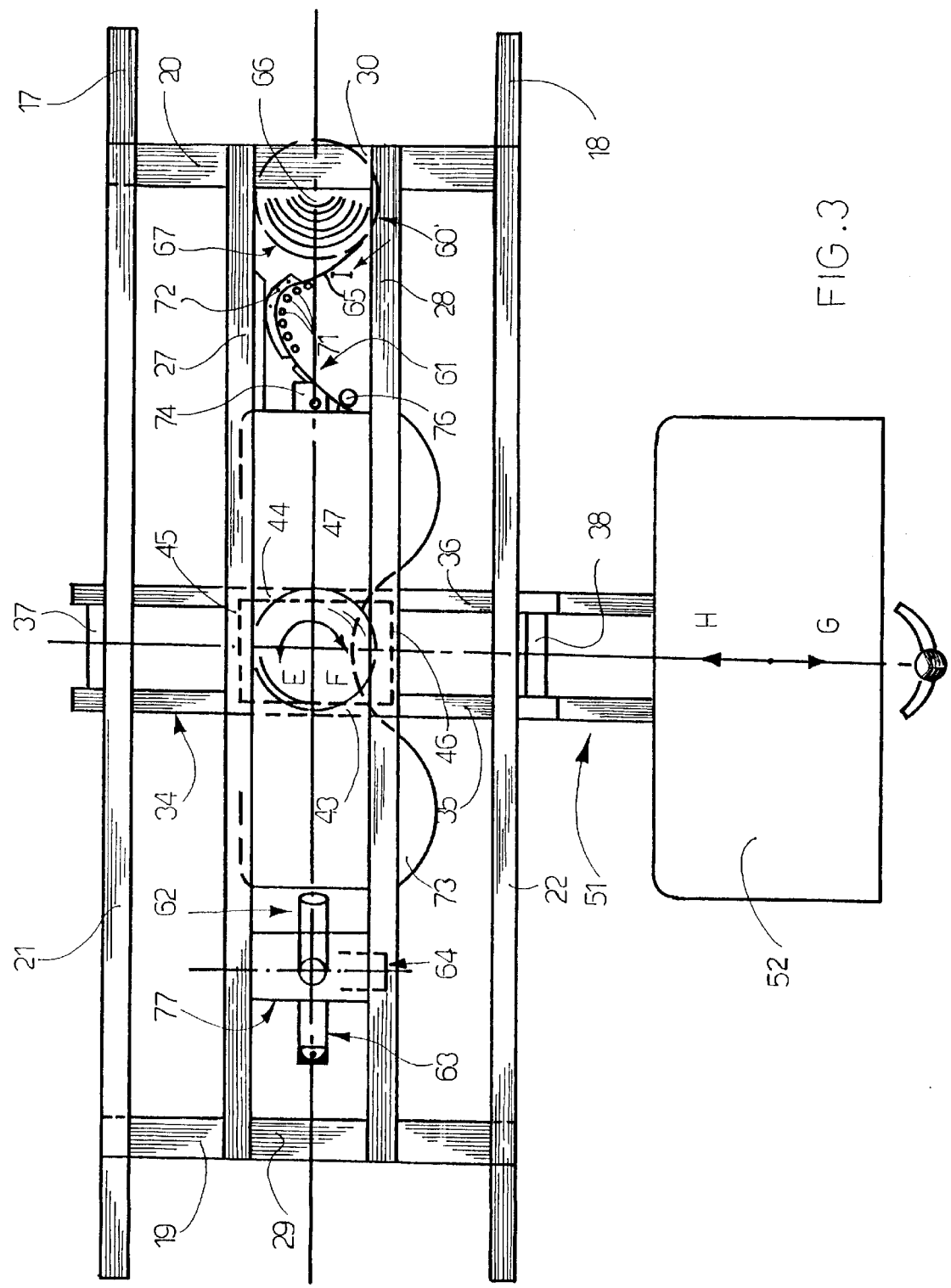
FIG. 3 schematically shows a plan view of the flanging-trimming machine of FIG. 1.

By referring particularly to the FIGS. 1, 2 and 3. in which a first embodiment of the present flanging-trimming machine 15 is shown, it is noted that such machine substantially comprises a lower base framework 16 formed by two longitudinal members 17 and 18 identical and having the same length, which are arranged spaced away and parallel from each other, and provided on the machine lower side and extended for the entire length thereof, and joined at their respective end portions by corresponding crosspieces 19 and 20, identical and having the same length, which is smaller than that one of the longitudinal members 17 and 18 and which extend for the entire machine width.

Moreover, the lower base framework 16 is joined to a pair of longitudinal members 21 and 22 provided-on the machine upper side, which are identical and have the same length of the corresponding lower longitudinal members 17 and 18, being extended horizontally and parallelly spaced from each other for the entire machine length, and this junction is effected by means of two pairs of vertical rectilinear stanchions 23 and 24, parallel from each other, whose end portions are fixed with the corresponding end portions of the respective lower longitudinal members 17, 18 and upper ones 21 and 22, as well as with the aid of two possible pairs of stiffening inclined crosspieces 25 and 26, whose end portions are joined to the corresponding end portions of the described longitudinal members.

The present flanging-trimming machine also comprises an additional pair of rectilinear longitudinal members 27 and 28, identical and arranged spaced away parallelly from each other on the machine upper side, at a height smaller than that where the longitudinal members 21 and 22 are situated, and at a position parallel and intermediate to these latter, said additional longitudinal members being extended also horizontally for the entire machine length and joined at their end portions by a respective crosspiece 29 and 30, as well as provided with rectilinear guide members 31 and 32 extended for a certain length of the corresponding longitudinal members, and fixed below them, which guide members engage corresponding sleeves with rotating balls 33 or similar rolling systems of a support structure 34, formed by a pair of rectilinear crosspieces 35 and 36 identical and arranged spaced away and parallel from each other as well as joined to each other by means of short longitudinal members 37 and 38, which extend in a direction transversal and orthogonal to said pair of longitudinal members, in such a way as to project laterally therefrom, thereby such support structure being slidable rectilinearly and reciprocatingly along the guide members 31 and 32 with a stroke defined by the length thereof.

The rectilinear reciprocating sliding of the support structure 34 is determined by a conventional D.C. electric motor, associated with the same structure and a drive constituted by a screw with precision balls or other suitable drive members of per se known type (all these component parts aren't shown in the Figures).

The reading of the different sliding positions of the support structure 34 is effected by means of encoder or any possible proper per se known mechanism, operatively connected in the machine electric circuit together with the remaining electric components of the same machine, in order to identify exactly and continuously such positions in the course of the different machine operative steps.

In turn, the support structure is provided with rectilinear guide members 39 and 40 fixed below the respective crosspieces 35 and 36, for a certain length thereof, which guide members engage corresponding sleeves with rotating balls 41 or similar rolling systems of an underlying transport and positioning carriage 42, made with a set of short metallic section bars joined together and forming a structure having preferably box-like shape, which are constituted by the respective pairs of section bars 43, 44 and 45, 46, said carriage being so sliding rectilinearly and reciprocatingly along the guide members 39 and 40 with a stroke defined by the length thereof. As previously, also in this case the reciprocating sliding of the carriage 42 is determined by a D.C. electric motor, associated with said carriage and a drive formed by a screw with precision balls or other proper drive members, and the reading of the different sliding positions is effected by means of encoder or the like, for the same purpose described above.

In particular, the transport and positioning carriage 42 is joined with an underlying rotating transport and positioning table 47, which rotates around a vertical spindle (not shown) by means of at least a circular crown gear 48 or other suitable mechanical drive member interposed between the lower side of the carriage 42 and the upper side of the table 47, and provided with such vertical spindle directed downward for a certain length, in order to permit the underlying table 47 to rotate thereabout when said crown gear 48 or mechanical drive member are driven in rotation.

This rotating table 47 is provided with a D.C. electric motor, operatively connected in the machine electric circuit and associated with a suitable reduction gear of per se known type (these components aren't known), and the operation of which causes the crown gear 48 or any other possible mechanical drive member to be rotatably driven and therefore the same table to be rotatably driven too in the respectively foreseen adjustment position.

Also in this case, the reading of the different rotating positions of the table 47 is effected by encoder or the like (not shown), in order to identify exactly and continuously these positions in the course of the different machine operative steps.

In this way, the so realized machine makes it possible to determine displacements along three different cartesian axes of the operative components thereof, namely along a first horizontal and longitudinal axis X by means of a rectilinear reciprocating sliding of the support structure 34, and therefore of the carriage 42 and the table 47 too, ag long the longitudinal members 27 and 28 in either one of the sliding directions A or B opposite to each other, along a second horizontal and transversal axis Y, which is orthogonal with respect to the first Cartesian axis X, by means of a rectilinear reciprocating sliding of the carriage 42, and therefore of the table 47 too, along the crosspieces and 36 in either one of the sliding directions C or D opposite to each other, as well as by means of rotation around a third vertical cartesian axis W, which is orthogonal with respect to the axes X and Y, by means of rotation of the table 47 with respect to the carriage 42 and the support structure 34 situated above it, thanks to the rotation of this table around the associated above mentioned vertical support spindle, in either one of the rotation directions E or F opposite to each other.

Furthermore, the table 47 is joined to an underlying mechanical structure 49 provided with a suction cup device 50 on its lower end zone, which is turned downward, and communicates with a suitable vacuum operated pneumatic system, of the kind separated or included in the machine (which system isn't indicated in the Figures), and adapted to provide for the movement of such structure in the vertical direction with a determinate stroke with respect to the table 47, in such a way that to displace the suction cup device 50 from a lowered to a raised position and vice versa with respect to the position where each product to be flanged is arriving, in order that such suction cup device can firstly draw by means of vacuum-operated suction each product and submit it to the flanging step, and subsequently at the end of this step can bring the flanged product back to the primitive position, for being drawn therefrom and replaced by another product to be flanged. Advantageously, the specified mechanical structure 49 is of removable and interchangeable kind and may me removed from the table 47 and replaced by further structures of the same kind, having different sizes and adapted to products to be flanged with different shapes and sizes, so as to determine always the drawing and disjunction of the same products with respect to such mechanical structure, by employing the pneumatic system referred to in the course of the different operative steps of the machine.

In addition, this flanging-trimming machine 15 comprises a loading and unloading system for the different-panels to be flanged, marked with the reference numeral 51, in which such panels are arranged and drawn selectively, by means of the suction cup device 50 of the table 47, for performing the flanging steps, and in which after that these steps have been performed the panels are stored and drawn in the manners which will be described later.

Such loading and unloading system 51 is substantially constituted by a movable support table 52 having almost rectangular shape, whose larger side extends horizontally in the same longitudinal direction with respect to the longitudinal members 27 and 28 of the machine, and centrally thereto, and which is supported by and fixed at an end portion of an underlying peripheral frame 53 having extended parallelepiped form, which is extended horizontally and transversally to the machine, being projected beyond it, and being in turn supported slidably by two pairs of short vertical stanchions 54 and 55, provided laterally and also adequately spaced away longitudinally with respect to the frame referred to, said stanchions being fixed with their lower end portions to respective longitudinal members 56 and 57, which are parallel to each other and with respect to such peripheral frame and being laid on and fixed on the corresponding lower longitudinal members 17 and 18 of the machine.

In particular, the peripheral frame 53 supporting the movable table 52 is supported by the stanchions 54 and 55 by means of proper sliding couplings 58 and 59 with low friction coefficient, formed for example by bearings slidable into corresponding guide tracks or by similar coupling devices of per se known type, in a way that such frame and therefore also the movable table 52 can slide with a rectilinear reciprocating movement and a pre-established stroke with respect to the same stanchions, in either one of the two sliding directions G or H opposed to each other, by the aid of an electric motor (not shown) supported by at least one of the stanchions referred to and operatively connected in the machine electric circuit, and with the interposition of a drive system of per known kind (not shown too).

The reading of the different sliding positions of both the peripheral frame 53 and the movable table 52 is effected by means of limit switches (not shown), operatively connected in the machine electric circuit with the remaining electric components of the same machine, in order to identify exactly and continuously such positions in the course of performing the different machine operative steps.

Figure 12:
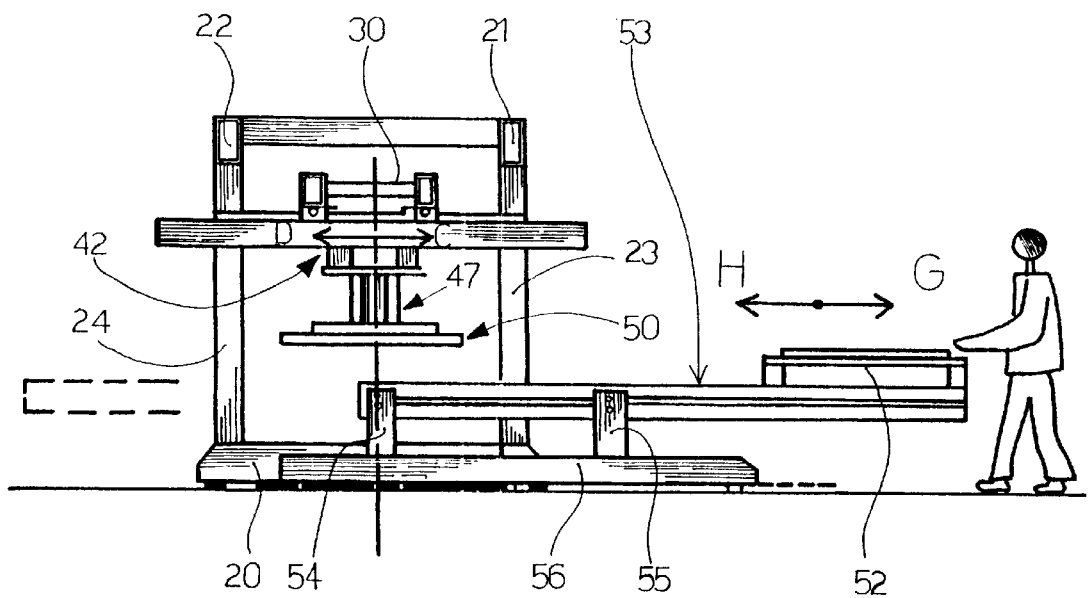
FIGS. 12 and 13 show a side view of a constructive item of the machine of FIGS. 1–3, moved into two different operative positions thereof.
Figure 13:
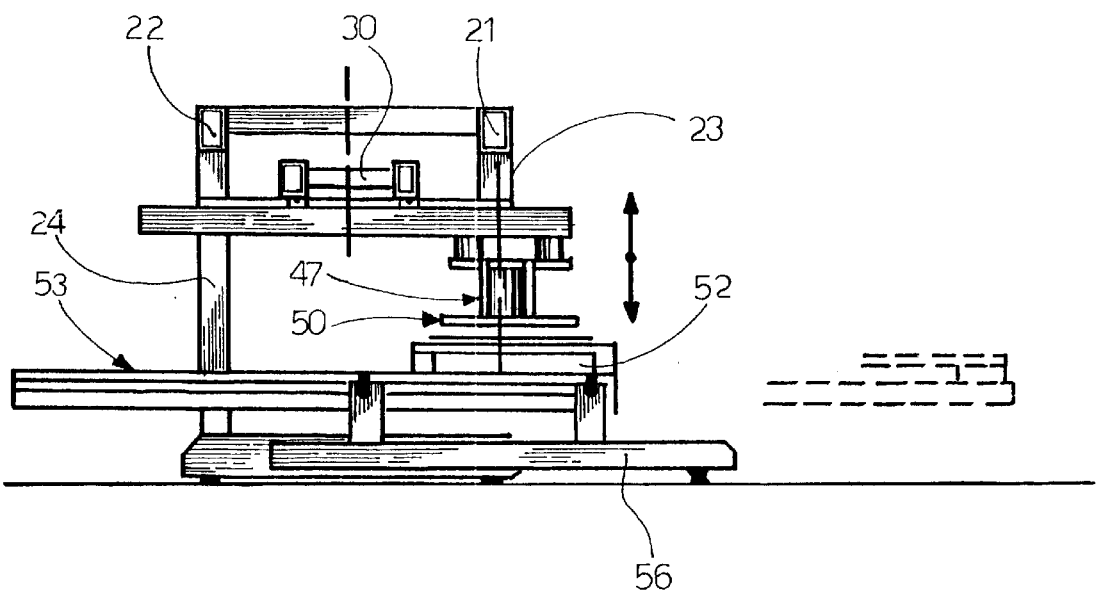
Figure 16:
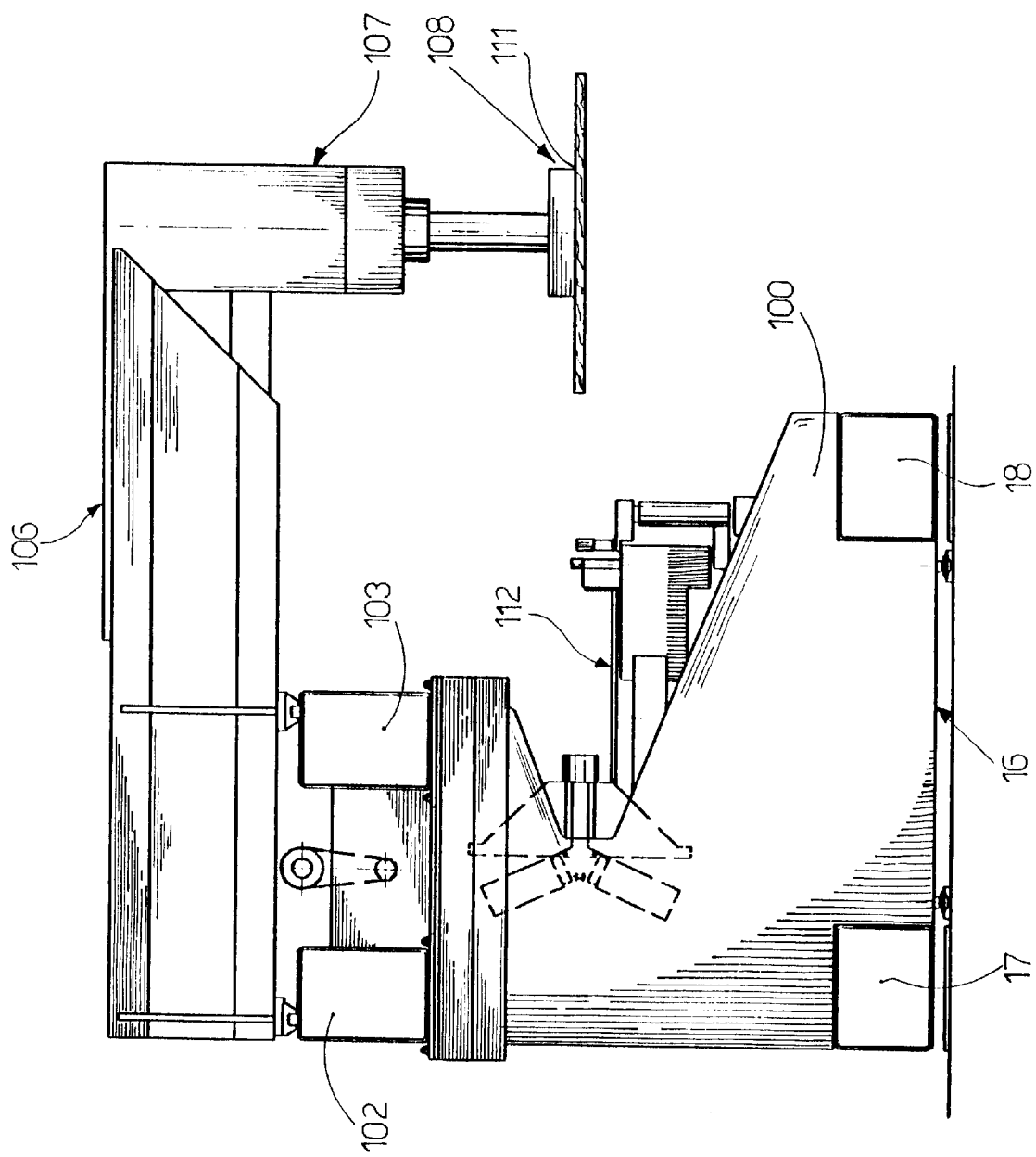
FIG. 16 schematically shows a side view of the flanging-trimming machine of FIG. 15.
Figure 17:
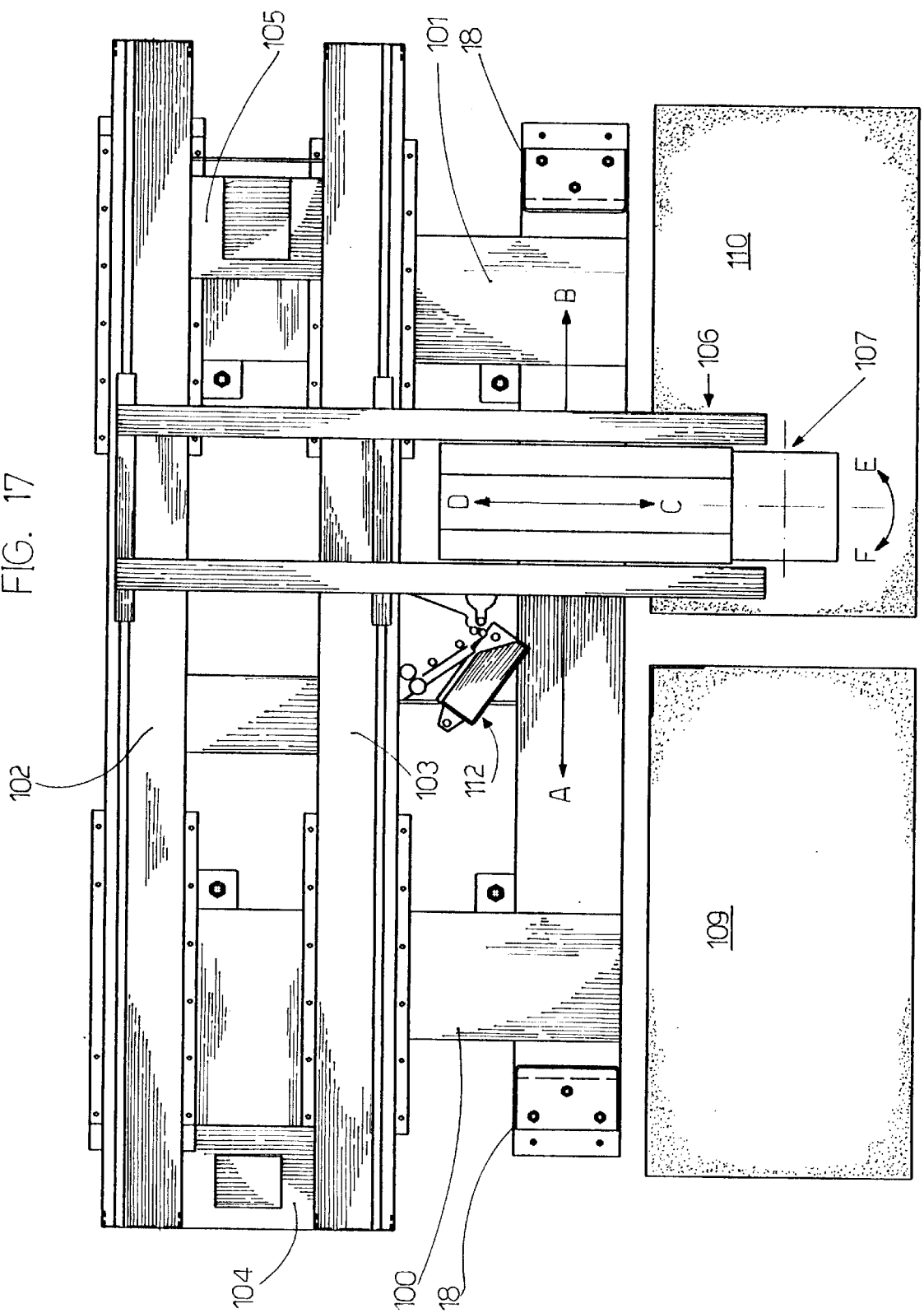
FIG. 17 schematically shows a plan view of the flanging-trimming machine of FIG. 15.
Figure 18:
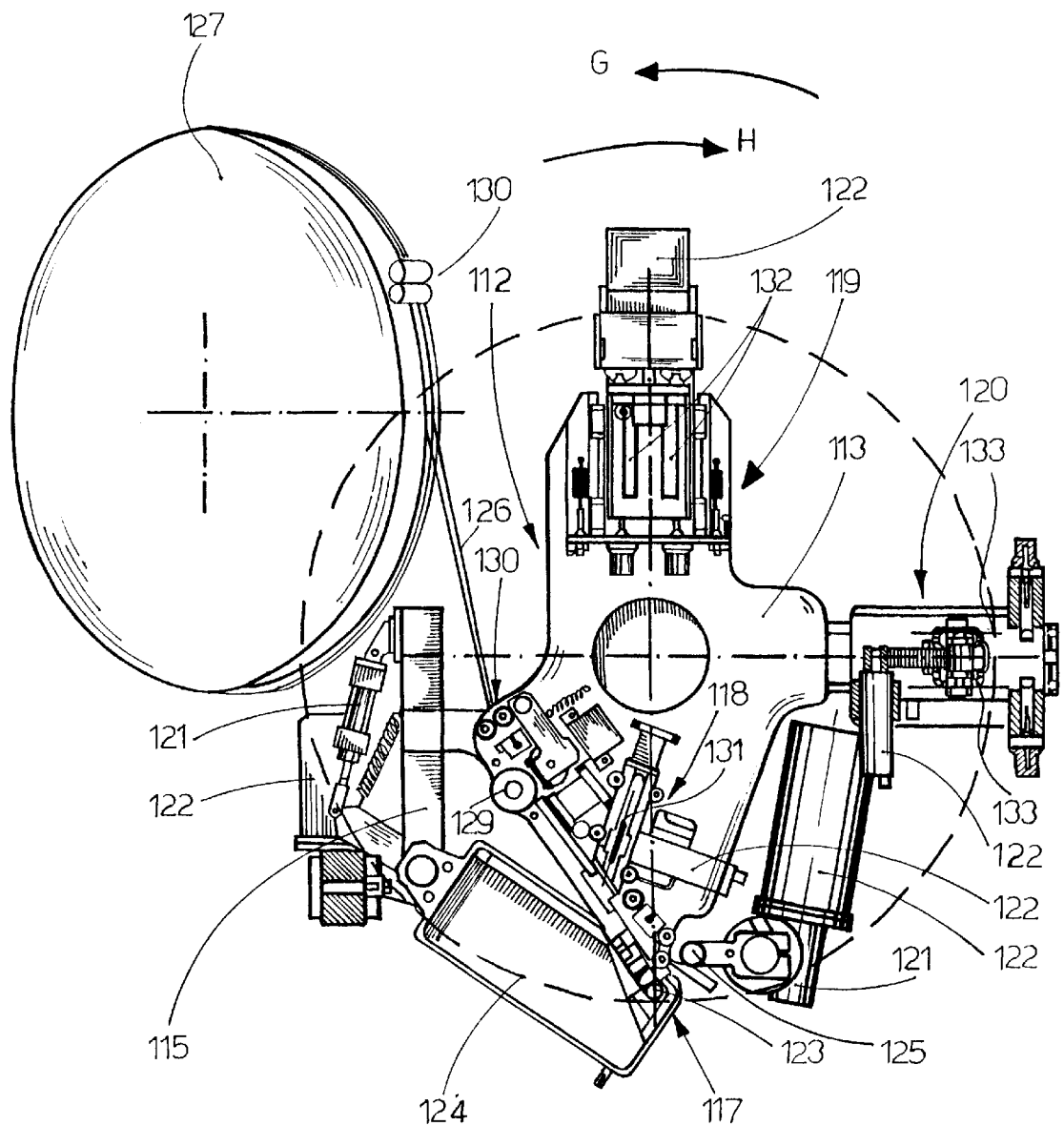
FIG. 18 shows a plan view of a constructive item of the machine of FIGS. 15–17.
Figure 19:
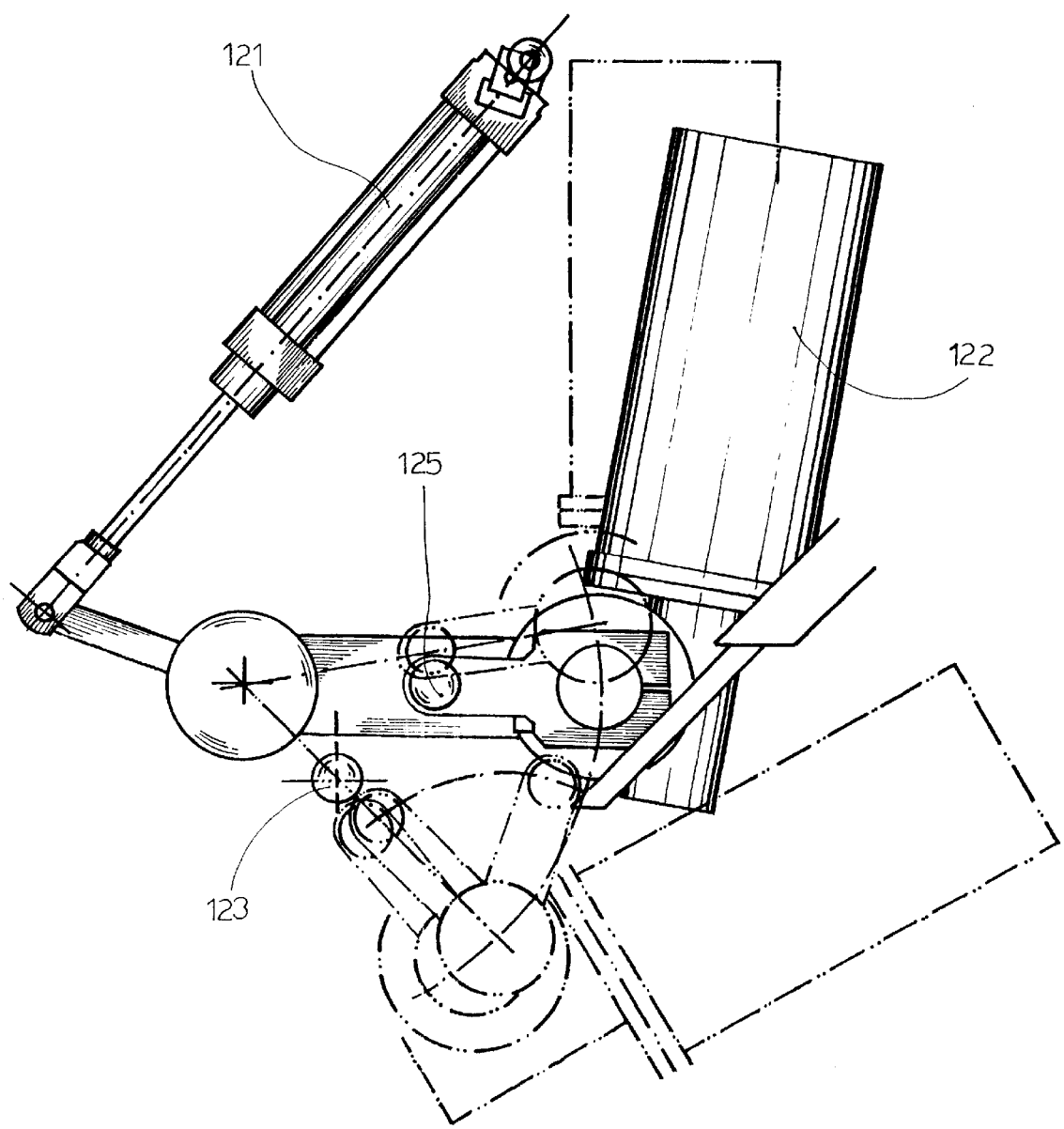
FIG. 19 shows an enlarged plan view of a portion of the constructive item of FIG. 18.
Figure 20:
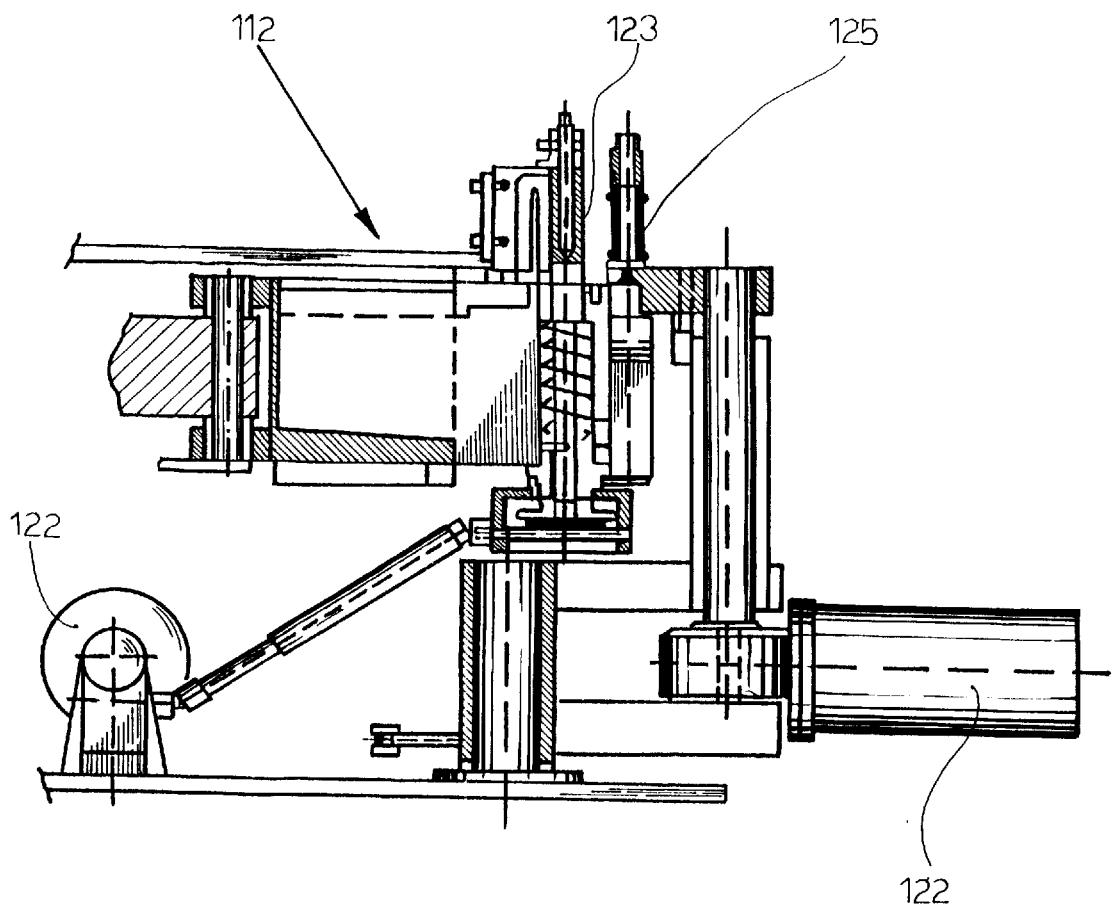
FIG. 20 shows a front view of the constructive item of FIG. 18.

In the FIGS. 12 and 13 is noted that the movable table 52 is slidable from a position extracted frontally from the machine (see FIG. 12), in which it is moved away and not coincident with respect to the suction cup device 50, thereby permitting one or more panels or products to be flanged to be loaded on the same table, and one or more panels or products after the flanging operation to be unloaded therefrom, to a position retracted in the machine (see FIG. 13), in which it is arranged on a position below and coincident with such suction cup device 50, so that this latter by lifting operation may draw the panel or panels or products arranged on the movable table 52, by submitting them to the machining steps which will be described, and may also lodge them onto said table again with an operation opposite to the preceding one, after these machining steps have been performed. In particular, the movable table 52 is so structured as to ensure an effective temporary fixing of each panel or product to be machined thereon, and to determine exactly and continuously the coordinates of positioning of such panel or product with respect to the different machine operative units, namely the support structure 34, the carriage 42 and the table 47 for the transport and positioning, and the suction cup device 50, thereby permitting the different machining steps which will be described to be performed.

For this purpose, the movable table 52 is provided for receiving a set of reference elements of various kind, per se known (not shown), whose coordinates are recognized by the positions in which such reference elements are applied onto the table referred to. In practice, the outline of each panel or product to be flanged is determined in advance and memorized on an adequate CAD-CAM software, and after that such panel or product is disposed onto the movable table 52 in correspondence of a certain reference element, whose coordinates are known and memorized on the CAD-CAM software, so that as soon as the machine is put in operation and the table 52 is displaced in the retracted position below the suction cup device 50, this latter is arranged for moving the panel or product depending on the relative coordinates thereof.

In turn, the different movements to be performed by any one panel or product to be flanged are memorized in advance as codified programs in the microprocessor controlling the CAD-CAM system, so that such panel or product may be displaced with a sequence of pre-established movements along the different Cartesian axes X, Y and rotation one w which correspond to those of the respectively set program. At the same time, the CAD-CAM system provides for controlling with the operative sequences of the set program also additional machine operative units, which will be hereinafter described in detail, and which are foreseen for applying the covering strips against the peripheral edges of the panel or products, so that such units provide for causing the same strips to be applied against the peripheral edge of each panel or product in the course of the displacement of this latter with the movements effected as previously described.

Figure 4:
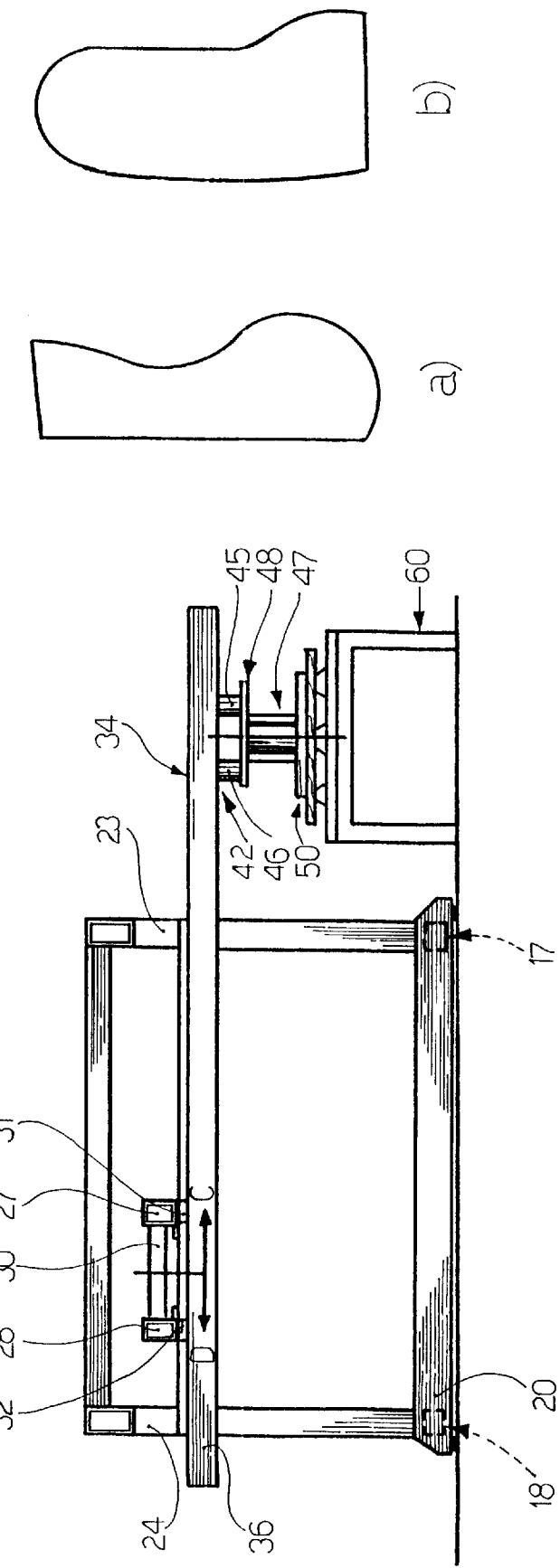
FIG. 4 schematically shows a side view of a flanging-trimming machine of panels according to the invention, in a second embodiment thereof.

By turning now to the FIG. 4, in which a second embodiment of the flanging-trimming machine according to the invention is shown, it is noted that such machine is substantially equal to that one previously described, and differs therefrom exclusively because in this case the rectilinear crosspieces 35 and 36 are dimensioned with a lenght greater than the preceding ones, by projecting themselves from the machine front side up to the level of a fixed support table 60, supported at such a height by an adequate carrying structure and so shaped as to be able to carry from time to time a respective panel or product, and in that the movable table 52, the peripheral frame 53 and the associated means for supporting and sliding it have been eliminated.

Moreover, in this solution the assembly formed by the movable carriage 42, the rotating table 47 and the suction cup device 50 is slidable along the associated guide members fitted to the rectilinear crosspieces 35 and 36, from the loading and unloading position illustrated in the Figure, in which it is extracted frontally with respect to the machine and displaced toward the free end portion of said crosspieces, thereby being arranged above the fixed support table 60 to permit a panel or product to be flanged to be drawn therefrom and an already flanged panel or product to be lodged thereon, to a position in which such assembly is displaced in the position retracted in the machine, in correspondence of the pair of longitudinal members 27 and 28, for performing the flanging of such panel or product. Still referring to the FIGS. 1, 2 and 3, there are shown these additional machine operative units which substantially comprise a unit 60 for dispensing the covering strips material, and a unit 61 for applying such covering strips against the peripheral edge of the respective panels or products, which are positioned in the machine sidewise such panels or products, as well as comprise a cutting unit 62, a trimming unit 63 and a scraping unit 64 acting on the covering strips in the manners and for the functions which will be described later, and which are positioned in the machine on the other side of such panels or products.

In particular, as it is evident from such Figures, the dispensing unit 60' is provided for receiving the material of the covering strips 65 to be applied against the peripheral edges of the panels or products, and for causing this material to be fed toward such panels or products, in order to be subsequently applied against such peripheral edges. This dispensing unit substantially comprises an idle rotating shaft 66 receiving each pre-assembled spool 67 of material of the covering strips 65, projected vertically upward from a horizontal support table 68 supported by vertical stanchions 69 attached to the machine lower base framework 16, at a position shifted outwards therefrom, said table being situated almost at the same height of the movable table 52 and the panels or products which are positioned thereon.

The dispensing unit also comprises a set of stationary rollers for the entrainment and guidance of the material of each covering strip 65, which are pivoted on the support table 68 and adapted to provide for the guided feeding of the same material toward each panel or products to be flanged, such rollers being constituted preferably by a first pair of powered and sprung rollers 70, slightly moved away from each other and situated near the outlet zone of the covering strip 65 with respect to pre-assembled spool 67, and a plurality of idle rollers 71 arranged adequately spaced away to each other along the advancement path of the covering strip 65, in a position opposed and slightly moved away with respect to a guiding section bar 72, which in the illustrated embodiment is of bent shape.

In this way, it appears evident that each covering strip to be applied against the peripheral edge of each panel or product, which strip may be made of plastic materal, wooden material or similar material, with the respectively foreseen aesthetical appearance, shape and size, is slightly unwounded from the pre-assembled spool 67 and introduced with its starting zone in the interspace defined between the pair of powered rollers 70 and the idle rollers 71 and the guiding section bar 72, in order to be subsequently transported by said powered rollers in the direction I through its advancement path, toward the next machine operative unit.

Figure 5:
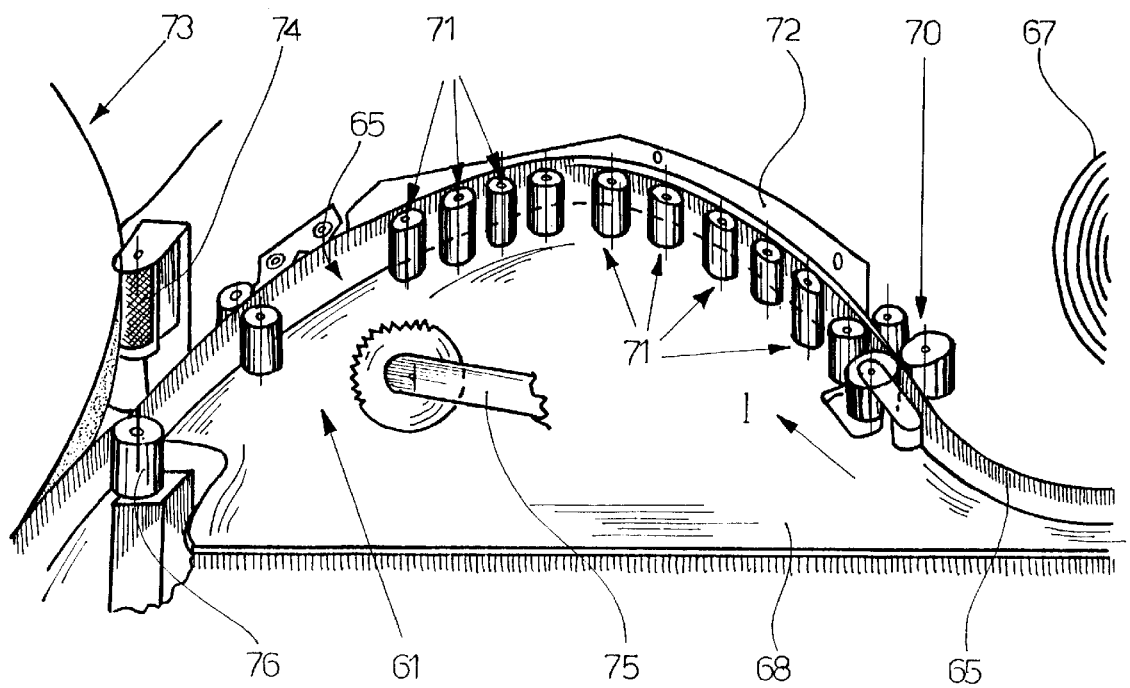
FIG. 5 schematically shows a perspective view of a constructive item of the machine according to the invention, provided for determining the fixing of the covering strips against the peripheral edges of the shaped panels.

Turning now to the FIG. 5, it is represented the unit 61 for applying each covering strip 65 against the peripheral edge of each panel or product 73, which is situated directly downstream the previously described dispensing unit 60' with respect to the advancement direction I of the same strip.

In particular, this applying unit 61 is arranged near each panel or product to be flanged 73 which has been drawn by the suction cup device 50, and is so shaped as to act against the peripheral edge of each panel or product, by applying firstly some adhesive materials, bonding agents and the like of conventional type thereon and then arranging and attaching the overlying covering strip against these se latter. For this purpose, the applying unit referred to substantially comprises at least a reservoir for containing the adhesive materials, bonding agents and the like (not shown), which is situated at a position below the support table 68 and provided internally with a conventional suction system of these materials (not shown too), adapted to transfer selectively them toward at least a rotating powered applying roller 74, pivoted on the support table 68 along the displacement path of each panel or product 73, when this latter is moved along the different Cartesian axes X, Y and W previously cited. In particular, this rotating applying roller 74 is driven by a D.C. electric motor with electronic control of its surface speed (not shown), in order to match such speed to the bent outline of each panel or product being machined, and is preferably supported by a pneumatic actuated training system (not shown too), which provides for a safe and effective abutment of such applying roller against the peripheral edge of the panel or product.

The applying step is performed by spreading firstly such adhesive materials, bonding agents and the like on the respective rectilinear and bent portions of the peripheral edge of each panel or product 73, by keeping such rotating applying roller 74 steadily pressed against the associated portion of peripheral edge of the panel or product, and by supplying it contemporaneously with the adhesive materials, bonding agents and the like sucked from the reservoir, and thereafter by letting a corresponding portion of covering strip 65 arrive on the applying area, which strip is unwound from the spool 67 and passed through the rollers 70, 71 and the guiding section bar 72, as well as cut at the respectively foreseen size by a suitable cutting element 75 (for example of the rotating saw type), which is controlled by the machine main computer and supported on the machine at a position interposed between the dispensing unit 60 and the applying unit 61.

Then, such portion of covering strip is pressed and let to adhere against the corresponding portion of peripheral edge by means of at least a pressing roller 76, pivoted idle on the support table 68 and driven by a two-stage actuator (not shown), from a rest position thereof at the cycle starting, in which it is moved away from such peripheral edge, to an operating position thereof in which it is approached to said peripheral edge and urged mechanically and resiliently in compression thereagainst. Advantageously, the different component parts of the above described applying unit 61 are enclosed into a suitable envelope (not shown), in which an optimum heating temperature is maintained for permitting the adhesive materials and bonding agents to be applied on position.

Besides, the reservoir of the adhesive materials and bonding agents is made of removable and inter-changeable type.

Now, by turning to the FIGS. 1 and 3 again, combined with the FIGS. 6–11, there are described in detail the remaining machine operative units, namely the cutting unit 62, the trimming unit 63 and the scraping unit 64, which are provided to perform a set of particular machinings as it will be described on the covering strips, which have already been applied onto the peripheral edge of the panels or products.

As it can be seen, these operative units are assembled together on a rotating platform 77 supported by an extended vertical shaft 78 which can be driven in rotation by an electric motor (not shown) operated by the machine main computer, and articulated at its upper side on a support member 79 fixed to the machine vertical stanchions and at its lower side to a support structure 80 attached to the base framework 16 of the same machine, laterally the panels or products which are disposed on the movable table 52 at a position opposite to that where the previously described operative units 60' and 61 are provided, said cutting, trimming and scraping units being equally spaced away angularly to each other on the rotating platform 77, preferably of a 90° angle, and said platform being slidable vertically along the associated extended shaft 78, from a rest position which is lowered with respect to such panels or products, in which none of the operative units 62, 63 and 64 is operating and into contact with the panels or products, to an operating position raised at the height of such panels or products, in which at least one of such operative units is operating and into contact with such panels or products, to perform the machinings hereinafter described.

In particular, the rotating platform 77 is controlled when it is moved on its lowered position, before a determinate machining with the operative units 62, 63 and 64 is performed, in a way to rotate of a suitable angle and such as to arrange from time to time one of these operative units on a position turned toward the panels or products, so that it can perform the relative machining of these panels or products when this unit is moved subsequently on its raised position.

Figure 6:
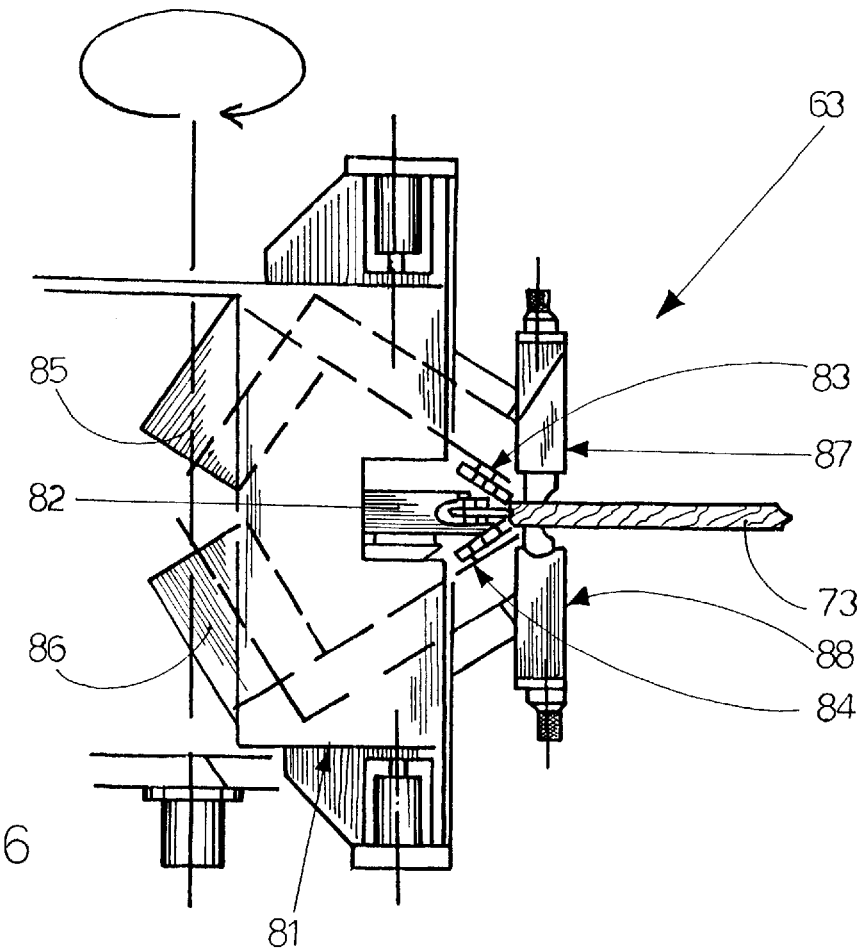
FIGS. 6 and 7 schematically show with respective side and plan views another constructive item of the present machine, provided for trimming the peripheral edges of the shaped panels.
Figure 7:
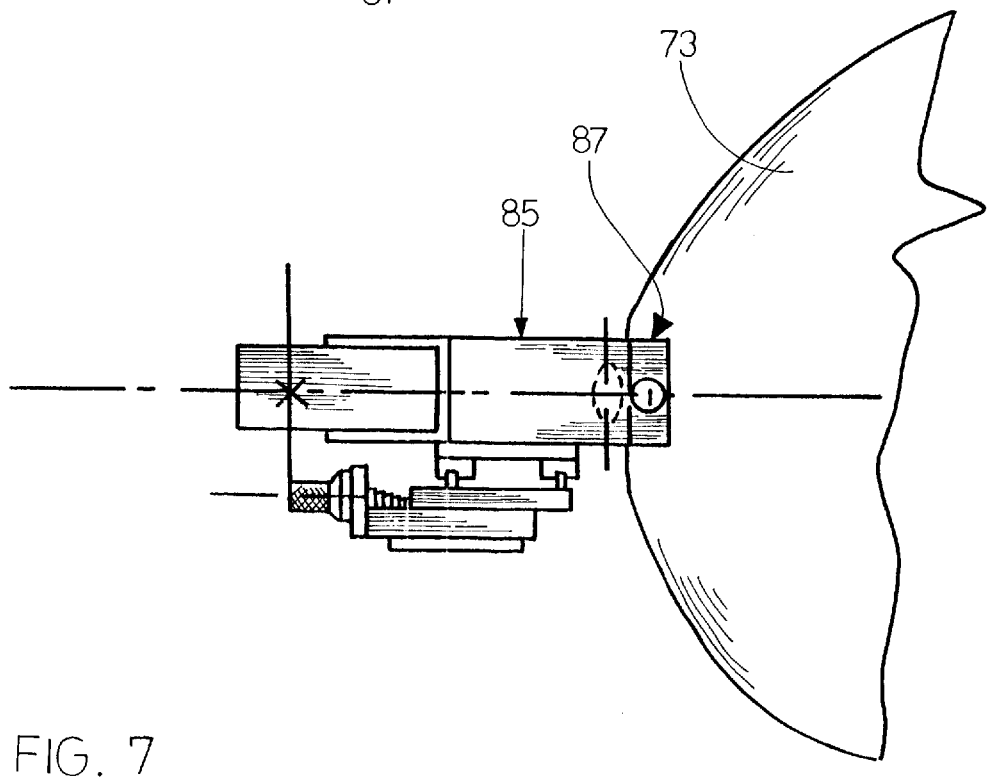

Reference is made now to the FIGS. 6 and 7, in which the trimming unit 63 is schematically illustrated, which unit is provided for trimming namely beveling adequately the edge of the covering strips for each panel or product. From these Figures, it is noted that this unit is substantially constituted by a set of powered and suitably profiled milling cutters, supported by a support plate 81 attached to the rotating platform 77 and projected upward therefrom, such milling cutters comprising preferably a central cutter 82 with vertical rotation axis, supported directly by the plate 81 and acting against the edge central zone of each covering strip, as well as an upper milling cutter 83 and a lower milling cutter 84 supported by a respective arm 85 and 86 attached to the plate 81, and acting respectively against the edge upper and lower zone of each covering strip, wherein such arms 85 and 86 are moved contemporaneously from a rest position thereof, in which they are spread apart to each other and therefore the associated milling cutters aren't into contact with and do not act against said edge, to an operating position thereof in which they are approached to each other and therefore the associated milling cutters are into contact with and act against said edge. Moreover, such arms 85 and 86 are advantageously provided with at least a respective positioning and locking element 87, 88, which when such arms are moved to their approached operating position arrange themselves against the respective upper and lower surfaces of the panels or products being machined, by determining in this manner on the one hand the temporary locking on position of such panels or products being machined and on the other hand the exact positioning of the corresponding milling cutters with respect to such panels or products, and therefore a correct trimming of the edges of these latter.

The present unit is also associated operatively to adequate feeler pins of per se known kind (not shown), disposed on the edge central, upper and lower zones, which sense the presence and outline of each flanged panel or product and, as response of such sensing operation, allow the trimming operation to start, by actuating the cutters acting against these edge zones.

Figure 8:
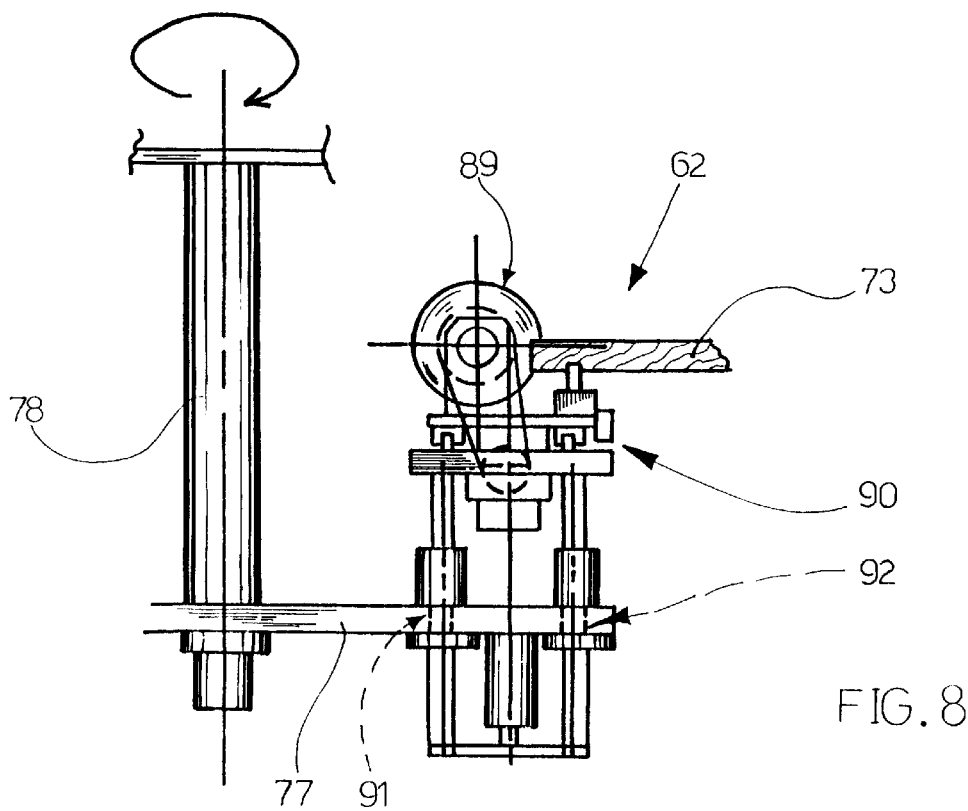
FIGS. 8 and 9 schematically show with respective side and plan views another constructive item of the present machine, provided for sawing the peripheral edges of the shaped panels.
Figure 9:
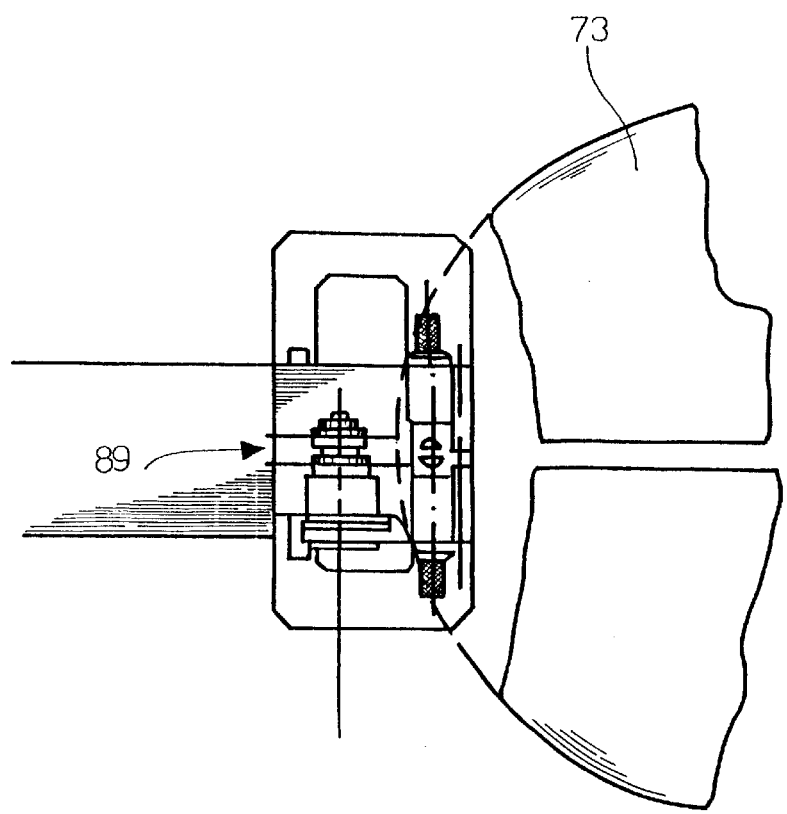

In the FIGS. 8 and 9 it is now illustrated schematically the cutting unit 62 provided for cutting the covering strips exceeding lateral ends.

This cutting unit is substantially constituted by a powered rotating saw 89, situated at the upper end portion of a vertically movable saddle 90 housed into corresponding through holes 91 and 92 bored through the rotating platform 77 and slidable rectilinearly and reciprocatingly therein, in a way to move such saw from a rest position thereof which is raised and moved away from the-strips to be sawn, wherein these latter aren't sawn, to an operating position thereof which is lowered and into contact with such strips, wherein these latter are sawn at the desired size in the pre-established cutting positions. This rotating saw in case may be also joined to other saws coaxial thereto, in order to determine the contemporaneous cutting of the strips associated to different panels or products.

Figure 10:
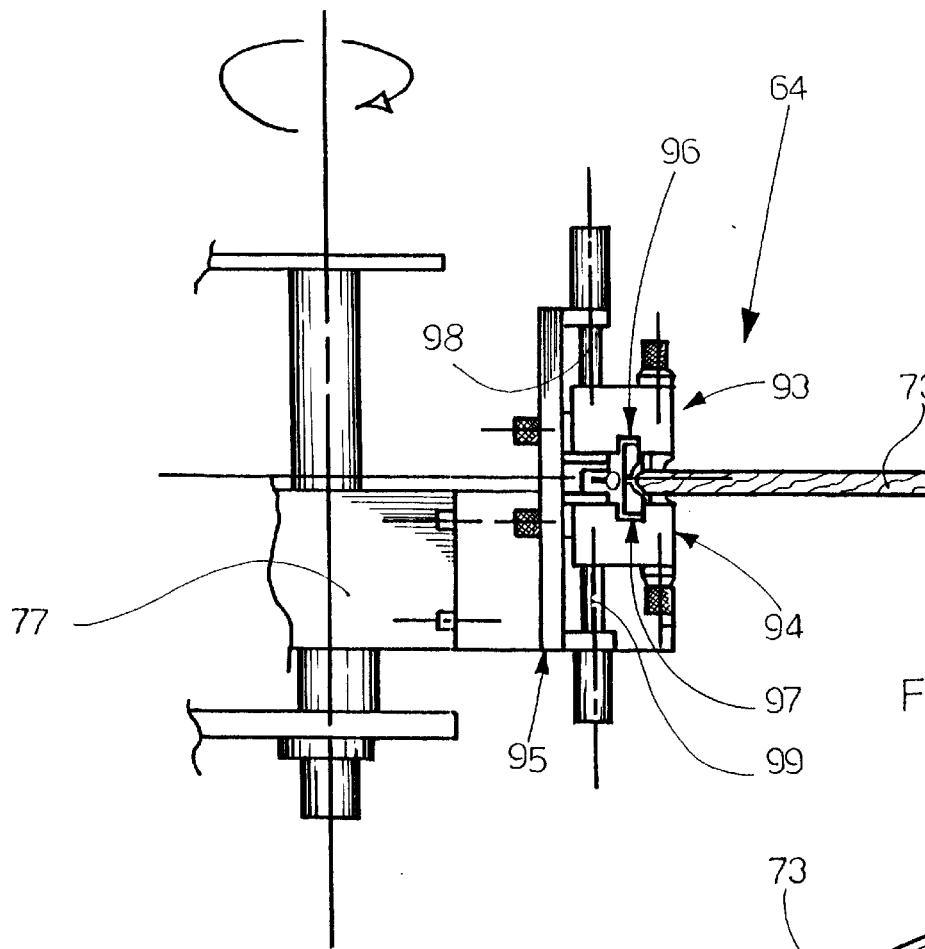
FIGS. 10 and 11 schematically show with respective side and plan views another constructive item of the present machine, provided for the final scraping of the peripheral edges of the shaped panels.
Figure 11:
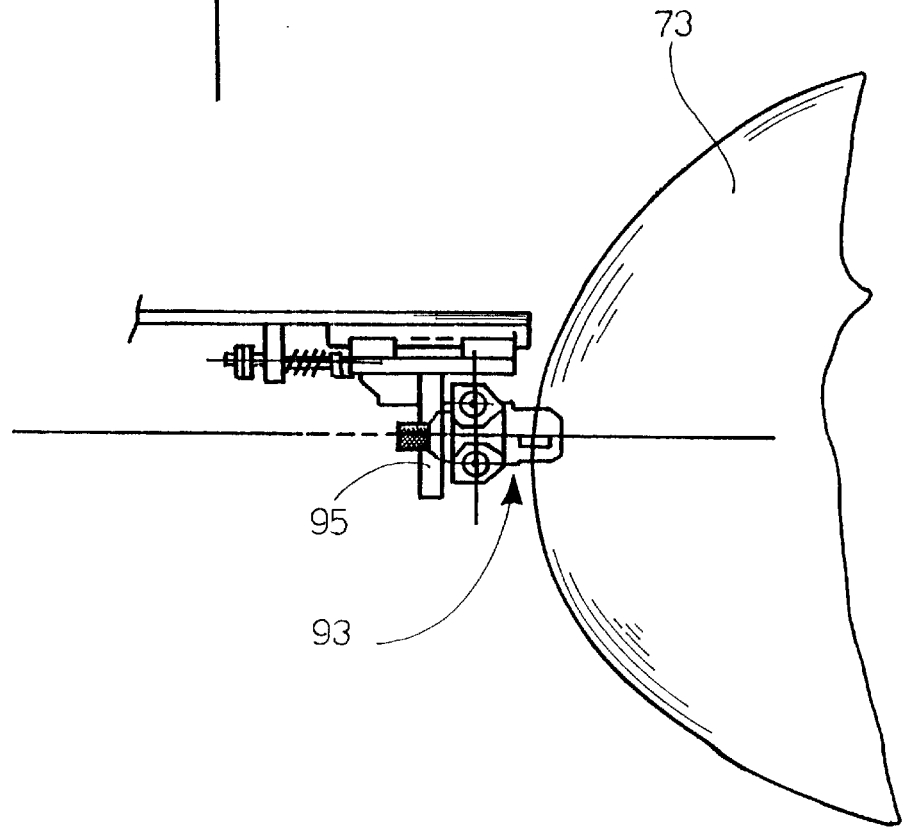

In the FIGS. 10 and 11 it is now illustrated schematically the scraping unit 64 provided for performing a final surface scraping operation of the entire covering strips edge periphery, in order to smooth these strips and confer them a satisfactory aesthetical appearance. This scraping unit is substantially constituted by at least an upper and a lower scraping tools 93 and 94 of per se known type, adapted to perform this machining, which are identical to each other and shaped hollowed with the same outline of each edge to be scraped, and which are assembled on a support structure 95 carried by the rotating platform 77, at a position symmetrical to each other and such that the associated shaped cavities 96 and 97 are turned toward them and the edge, said tools 93 and 94 being slidable rectilinearly and reciprocatingly along a correspondent vertical shaft 98 and 99 of such support structure 95, in order to be so able to be displaced contemporaneously from a first rest position thereof, wherein they are raised and moved away from the associated edge, and therefore do not act thereagainst, to a second operating position thereof, wherein they are lowered and approached to such edge, and consequently act thereagainst.

The present scraping unit is also associated operatively to suitable feeler pin elements of per se known kind (not shown), which are adequately positioned and adapted to sense the presence and the outline of each flanged panel or product and, as response of such sensing operation, allow the scraping operation to start, by actuating the corresponding scraping tools. In particular, the strips edges are normally submitted in succession to cutting, trimming and scraping operations by controlling in the manner as described the associated operative units 62, 63 and 64 to displace themselves in accordance to such succession toward the same edges, but it is obviously possible also to exchange such operative sequences, as well as to add any possible machinings to those already provided, in this case by providing further operative units assembled on the rotating 20 platform 77, thus without departing from the protection sphere of the present invention.

Moreover, according to the invention, it is also possible to provide the operative units 62, 63 and 64 separately, by arranging them for example on separate equipments connected mechanically to the machine referred to and also provided for performing traditional machinings of the panels, for example on copying machines of pantograph type, thus performing the above mentioned machinings on the present machine and the equipments referred to as well.

The operation of the machine according to the invention, in the first embodiment thereof, is synthetically described hereinafter, wherein the machine is designed for being loaded with panels or 35 products to be flanged assigned four different uses for example for realizing furniture component parts, etc. . . . , and which are machined in advance with the pre-established shapes and sizes by means of conventional operative machines such as for example the copying machines of pantograph type.

Firstly, such panels or products are disposed one or more at a time onto the movable table 52 of the loading and unloading system 51, which in this step is displaced in its extracted position evident from the FIG. 12, and they are locked with the above specified criteria in the respective position.

Then, the movable table is displaced in it retracted position evident from the FIG. 13, in which such panels or products are displaced in correspondence of the overlying suction cup device 50, which is driven thereafter in a manner to lift such panels or products which are submitted in succession to the machining steps already described previously.

Finally, at the end of all these machinings the flanged panels or products are lodged again on the movable table 52, by lowering the suction cup device 50 at the level of the same table, and displacing such movable table again in its extracted position, for unloading them and loading one or more panels or products to be flanged.

Therefore, the so realized flanging-trimming machine is able to perform effective and automatized flanging machinings on panels or products made of different kind, shapes and dimensions, having rectilinear, curvilinear and mixed rectilinear-curvilinear outlines, by adapting it simply and quickly for performing different machining programs, for panels or products of the most varied kinds, with consequent high productive capability and flexibility of the same machine.

The FIG. 14 a shows by way of example only some shapes of panels or products which can be machined with the present machine. It is to point out that the memorized operating programs and which can be set on the machine main computer may be in case also modified adequately, with per se known criteria, by adapting them for performing machinings of panels or products not only in the present flanging-trimming machine but also in other conventional operative machines such as for example the copying machines of pantograph type. 5

Then, in these cases it is appropriate that each so modified program can be set and displayed on a separate computer center, wired to the associated control computer units for these machines and arranged to control the separate or contemporaneous operation 110 of the same machines, through said computer units. Likewise, all the memorized and computed informations of each program may be also printed, by displaying also the shape of each panel or product to be machined.

In the FIGS. 15–20 it is now schematically illustrated a flanging-trimming machine 15 for differently shaped panels or products according to the invention, in a further embodiment thereof. Therefore, also in this case, such machine substantially comprises a lower base framework 16 formed by two longitudinal members 17 and 18 which are identical and of the same lenght, and arranged spaced away and parallel from each other on the machine lower side, and joined together by a suitable support structure provided with two vertical stanchions 100 and 101 supporting a pair of longitudinal members 102 and 103, identical and situated on the machine upper side, as well as extended horizontally and parallelly spaced away from each other for the entire length of the same machine, which longitudinal members are joined at their end portions by corresponding crosspieces 104 and 105 in a direction transversally thereto.

The present flanging-trimming machine also comprises a support structure 106, carried by the longitudinal members 102 and 103 in a direction transversally thereto and made in a manner identical to the support structure of the previously described machine, and supporting a transport and positioning carriage 107 joined to an underlying rotating system 108, provided for drawing and releasing the panels or products, and movable also in this case both in the longitudinal and transversal directions with respect to the longitudinal members 17 and 18, with consequent displacement of the panels or products with the same reciprocating movements as described above, respectively longitudinal A and B. transversal C and D, rotating E and F and vertical movements.

The machine further comprises a loading and unloading system for the different panels or products, constituted by a loading station 109 for the panels or products to be flanged and an unloading station 110 for the flanged panels or products, which are arranged in two different positions in front of the machine base framework 16, and formed by adequate support surfaces or roller units and the like of per se known type, in which each panel or product is respectively drawn or released by the corresponding suction cup device 111 of the rotating system 108, by a longitudinal sliding of the support structure 106 from the corresponding loading position 109 to the unloading position 110.

The present machine additionally comprises at least a rotating platform 112, evident from the FIGS. 15, 18, 19 and 20, formed by two shaped plates respectively an upper plate 113 and a lower plate 114, which are parallel and spaced away as well as joined to each other by means of vertical columns 115, which platform in turn is supported by a rotating table 116 housed in the machine lower base framework 16 and disposed at a position intermediate between the vertical stanchions 100 and 101 of the support structure of the same machine, and is also foreseen for housing the means 117 for applying the covering strips against the peripheral edge of each panel, and the cutting means 118, the trimming means 119 and the facing means 120, which are provided for determining respectively the cut of the strips at the required sizes, as well as the trimming and the facing namely the possible cut of the head edges thereof, and for housing also possible additional means such as scraping means (not shown in the Figures) to perform other machinings of the same strips.

For this purpose, such applying, cutting, trimming and facing means are fitted to the upper plate 113 of the rotating platform 112 and adequately spaced angularly from each other as well as associated to adequate driving units of per se known type, as for instance correspondent cylinders 121 of pneumatic or oleodynamic type, etc., and electric or pneumatic motors 122, which are fitted partially on the 15 lower plate 114 of said rotating platform, in a manner that the different machinings which have been foreseen in the present machine can be performed by rotating the rotating platform 112 in a single rotation direction G only, or also in the rotation direction H opposite thereto, therefore by displacing from time to time any one of the operative means as described above in correspondence of a pre-established machining area, depending on the respective operative steps to be performed included in the programs which have been set.

In particular, it is noted that the applying means 117 are constituted, as for the other embodiment of the machine, by at least a powered rotating applying roller 123, actuated by the driving unit of the sane applying means and foreseen for spreading against the entire peripheral edge of each panel the employed adhesive materials and bonding agents, which are contained into at least one separate reservoir 124, and by at least a pressing roller 125 actuated by a corresponding driving unit (in this case, formed by a cylinder 121 and a motor 122), which is disposed on and carried by the lower plate 114 of the rotating platform 112 and can be controlled manually or automatically by a machine electronic control system, in such a way as to displace the same roller in different positions with respect to the preceding applying roller 123 when the panel or product is being machined, thereby adapting it to the different outlines of the panels or products to be flanged, said pressing roller being also adapted to press each employed covering strip 126 against the peripheral edge of the panel or product on which the adhesive material or bonding agent has been spread, so as to cause it to be glued along such peripheral edge. In this case, the covering strip 126 is still wound, as the preceding machine, around a pre-assembled spool 127, which here is pivoted by means of a stud 128 on the lower plate 114 of the rotating platform 112, at a position inclined with respect to the horizontal surface of the plates 113 and 114, so as the covering strip 126 is progressively unwound from the spool 127 by the action of an entrainment motor 129 fitted on the lower plate 114, up to position its free end portion, which is suitably guided by some rollers 130, in the area of the applying roller 123 and pressing roller 125, so as to perform the above mentioned operations, in which condition such motor 129 is then disconnected and such pressing roller provides for pressing always correctly the covering strip against the peripheral edge of each panel or product, thanks to the adjustment of its distance from the applying roller in conformity with the different outlines of the panels or products to be flanged, which circumstance permits to perform accurate machinings, particularly in the case of flangings of bent peripheral edges having reduced radiuses. Afterwards, as soon as such machinings have been ended, the cut of each strip applied thereto is performed by means of the cutting means 118, which are constituted by one or more rotating saws 131 which provide for cutting this strip end zone. Thereafter, the rotating platform 112 is driven in rotation in such a way to perform the directly next machining steps of the so applied strip, in combination with the movement of the panel or product obtained by means of the support structure 106, by displacing the trimming means 119 in correspondence of the end zone of such strip, which means are formed by one or more rotating milling cutters 132 providing for trimming namely beveling adequately the edge of the same strip, and finally the facing means 120 formed by a pair of blades 133 providing for cutting the strips head edges only in the case of machining of the so called "open ring" type. Obviously, as already explained, further operative means can be foreseen in the rotating platform 112, such as for example suitable equipments for applying rubberized covering strips, for rounding off the terminal edges etc...

In this way, the different machine operative steps are performed by displacing the support structure 106 with the associated carriage 107 firstly in correpondence of the loading station 109, in which each panel or product to be flanged which has been lodged here in advance is drawn, then with a movement in the single feeding direction B in succession in correspondence of the rotating platform 112, in which the above mentioned operative steps are performed, and finally in correspondence of the unloading station 110, in which such flanged panel or product is released and the support structure 106 is brought with a quick feeding movement in the direction A back in correspondence of the loading station 109, in which a new panel or product to be flanged has been already lodged and will be machined with the same described operative sequences.

Therefore, the so made flanging-trimming machine thanks to the fact that the operative units are all assembled directly on the rotating platform 112, and no more in different positions as previously, is of compact costruction and permits the machining steps to be performed in a rational manner and with improved productive performances, and can be adapted in the line also with further woodworking machines.

I claim:

1. A flanging-trimming machine for panels having peripheral edges, said machine adapted to cover the edges with an irremovable covering strip using an adhesive, said machine comprising
   (a) a main supporting structure (16, 60, 21, 11, 27, 28, 102, 103),
   (b) a reservoir having the adhesive therein,
   (c) means for supporting, transporting, and positioning said panels (34, 42, 47, 49, 50, 51, 106, 107, 108, 109, 110) which is supported by the structure, which is displaceable with a rectilinear reciprocating movement along a first horizontal and longitudinal axis X and a second horizontal and traversal axis Y which is orthogonal to the axis X, which is displaceable with a rotational reciprocating movement along a third vertical axis W which is orthogonal to the axes X and Y, and wherein the structure cooperates with the means for supporting, transporting, and positioning for (aa) selectively drawing the panels from the transporting means so that the strips can be applied thereon and for (bb) lodging the panels after the strips have been applied where said (aa) and (bb) are performed by operating the supporting, transporting, and positioning means with along the X, Y, and Z axes,
   (d) a preassembled spool (67, 127) of the material for the strips (65, 126),
   (e) means for applying the strips to the edges which is associated with a means to dispense the strips and which is adapted to apply the adhesive to the edges first and thereafter to apply the strips to the edges;
   (f) a cutting means (62, 118) for cutting the strips to the proper size,
   (g) a trimming means (63, 119) for trimming along the strips after application, and
   (h) a scraping means (64) for finishing the surface of the strips after application.

2. The machine according to claim 1 which has an upper side and which comprises short longitudinal members (37, 38), a pair of rectilinear longitudinal members (27, 28) spaced away and parallel to each other and located on said upper side of said machine, a pair of guide members (31, 32) located below said longitudinal members (27), (28), wherein said means for supporting, transporting, and positioning comprise a pair of rectilinear crosspieces (35, 36), said cross pieces (35, 36) being extended transversally and orthgonally to said pair of rectilinear longitudinal members (27, 28), said short longitudinal members extending in a direction transversal and orthogonal to said pair of longitudinal members, said supporting structure, sliding reciprocatingly along said guide members (31, 32) by means of control and drive means.

3. The machine according to claim 2 which comprises two longitudinal members (17, 18), a pair of crosspieces (19, 20), said machine has a lower side and and a pair of second longitudinal members (21, 22), wherein said main supporting structure is formed by said two longitudinal members which are spaced away and placed on the lower side of said machine, parallel to each other and each has an end portion, both said end portions being joined by said crosspieces, said pair of second longitudinal members are provided at the upper side of said machine, and the machine also comprises stiffening crosspieces (25, 26) which have end portions, said end portions of said two longitudinal members join with the end portions of said crosspieces.

4. The machine according to claim 2 which comprises a pair of crosspieces (29, 30) wherein said rectilinear longitudinal members are parallel and located intermediate between second longitudinal members (21, 22), and said second longitudinal members are joined with said pair of rectilinear longitudinal members.

5. The machine according to claim 2 which comprises guide members (39, 40) fitted on a lower side of said crosspieces, wherein said supporting, transporting and positioning means of said panels comprise a movable carriage (42), said carriage having a vertical spindle and a rotating table (47), said table being supported by said pair of crosspieces (35, 36) on the lower side thereof, and movable respectively with rectilinear reciprocating movements along said guide members (39, 40) fitted on the lower side of said crosspieces (35, 36), and with rotation movements around said vertical spindle of said carriage (42).

6. The machine according to claim 5 which comprises an underlying mechanical structure (49) and a pneumatic operated suction cup (50), and said rotating table (47) is joined to said mechanical structure (49), said suction cup device (50) being turned toward each of the panels and being movable pneumatically and vertically by said mechanical structure (49), from a position raised and moved away with respect to each of the panels to a position lowered into contact with each of the panels.

7. The machine according to claim 6 wherein said mechanical structure (49) and said suction cup device (50) are are exchangeable.

8. The machine according to claim 6 which comprises a loading and unloading system (51), said loading and unloading system being constituted by a movable support table (52), and an underlying peripheral frame (53), said movable support table (52) having a substantially rectangular shape and assigned to support the panels and supported on and fitted to an end portion of said underlying peripheral frame (53), said frame being extended and of a parallelepiped shape and the machine also comprises a lateral supporting structure (54, 55, 56, 57), said frame (53) being extended transversally to said main support structure and being fitted by means of said lateral supporting structure (54, 55, 56, 57) thereto by a sliding coupling (58, 59), said coupling being adapted to permit a rectilinear reciprocating movement of said peripheral frame (53), together with said movable table (52) from a position thereof extracted from the machine in which on the movable table the panels are loaded and unloaded and the panels to a position retracted in the machine and coinciding with said suction cup device (50), in which said suction cup device draws said panels to be flanged from the movable table and lodges the already flanged panels on the movable table.

9. The machine according to claim 8 which comprises dispensing means (60') and a plurality of reference elements adapted to define cartesian coordinates of each said panel laid thereon, and whose Cartesian coordinates memorized as codified coordinates into a suitable CAD-CAM software system are found by the positions where said reference elements are applied on the dispensing means, said CAD-CAM software system comprising as codified information also the outline of each said panel and said movable table (52) is provided with said reference elements, said movable table (52) being adapted to control, depending on sensed coordinates and each operating program to be performed which has been memorized in the same software system, said pair of crosspieces (35, 36), said movable carriage (42), said rotating table (47) and suction cup device (50), so as to displace each said panel, said dispensing means (60'), said applying means, said cutting means (62), said trimming means (63) and said scraping means (64) with the operative sequences provided for performing the flanging of this kind of panel or product.

10. The machine according to claim 9 wherein said dispensing means (60') comprises an idle rotating shaft (66) receiving said preassembled spool, said shaft (66) being projected vertically upward from a horizontal support table (68) supported by said main support structure, and situated at approximately the same level of said movable table (52) and the panels arranged thereon, and the dispensing means also comprises a set of entrainment and guiding rollers (70, 71) disposed along the advancement path of said covering strips, to provide for guided advancement of said strips from said spool to said applying means, by passing through at least a cutting element (75) adapted to cut said strips at the respectively determined sizes.

11. The machine according to claim 10 wherein said applying means comprises the reservoir for the adhesive, at least one applying roller (74) and one pressing roller (76) pivoted on said support table (68), near and laterally to said panels, along the advancement path of said covering strips, said applying roller (74) cooperating with the peripheral edge of said panels and communicating with said reservoir in order to suck therefrom the adhesive contained therein and spread the adhesive them on the peripheral edge onto which at least one of said covering strips is then applied and said pressing roller (76) being adapted to be subsequently pressed against said covering strip.

12. The machine according to claim 11 wherein said applying roller (74) rotates and is actuated by a control means adapted to adjust the rotation speed thereof in a way to adapt it to the outline of said panels being machined.

13. The machine according to claim 12 which comprises a rotating platform supported by a vertical rotating shaft (78) said cutting means, said trimming means and said scraping means are assembled together on said rotating platform, said shaft (78) being provided onto said main support structure laterally to said panels with an angular distance from each other at a 90° angle, said platform being slidable along said vertical shaft (78) from a lowered rest position to an operating position raised at the same height with respect to said panels and being so controlled as to displace selectively said cutting means, said trimming means and said scraping means from their rest positions ot their operating positions turned toward said panels so as to perform the related machining.

14. The machine according to claim 13 wherein said cutting means comprise at least one powered rotating saw (89) assembled slidably on a movable saddle (90) supported by said rotating platform in correspondence of the side end portions of said covering strips, so as to cut the exceeding portions thereof, said rotating saw (89) being slidable into said movable saddle (90) from a rest position which is raised and moved away from said strips to be sawn wherein the strips are not sawn to an operating position which is lowered and in contact with said strips wherein the strips are sawn.

15. The machine according to claim 14 wherein said trimming means comprise a first, a second and a third adequately profiled rotating milling cutters (83, 84, 82) supported by said rotating platform and arranged respectively on the upper, lower and central zone of the covering strip, said first and second rotating milling cutters being supported by a respective arm (85, 86) provided with a corresponding positioning and locking element (87, 88) adapted to be positioned and locked with respect to the panels, said arm (85, 86) being movable contemporaneously from a rest position to an operating position thereof, on the condition in which the corresponding milling cutters and positioning and locking element do not act and act against said covering strips.

16. The machine according to claim 15 wherein said scraping means comprise at least a first and a second scraping tools (93, 94) for smoothing and finishing the edge of said covering strips, which are supported by said rotating platform and arranged above and below said strips, said first and second scraping tools (93, 94) being slidable reciprocatingly and contemporaneously from a rest position to an operating position thereof, in which they do not act and act against the edges os the covering strips.

17. The machine according to claim 16 which comprises feeler pin elements associated with said trimming means and scraping means and cooperating with said panels in a manner that in response to sensing of the presence of the panels, they activate the operation respectively of said rotating milling cutters (83, 84, 82) and said scraping tools.

18. The machine according to claim 2 which comprises a movable carriage (42), a rotating table (47) and a suction cup device (50) wherein said means for supporting, transporting, and positioning comprise a fixed support table (60) and an assembly formed by said movable carriage (42), said rotating table (47) and said suction cup device (50), said assembly is slidable reciprocatingly along said crosspieces (35, 36), said crosspieces being extended up to above said support table said assembly being slidable from a position extracted from the machine and coinciding with said support table so as to draw a panel to be flanged therefrom and lodge an already flanged panel thereon, to a position retracted in the machine in correspondence of said pair of rectilinear longitudinal members (27, 28), for performing the flanging of the panel.

19. The machine according to claim 1, said machine having a lower side and an upper side and comprises the main supporting structure formed by two longitudinal members (17, 18) arranged on said lower side of said machine, said two longitudinal members being parallel and spaced away one from tide other; a pair of support longitudinal members (102, 103) located on the machine upper side; crosspieces (104, 105); said support longitudinal members being supported by said two longitudinal members, said support longitudinal members each having an end portion and being joined at the end portions with said two longitudinal members, the machine also comprising a support structure (106) which supports said support longitudinal members; applying means (117); facing means (120); said applying means, said cutting means, said trimming means, said scraping means, and said facing means are assembled together onto at least a movable structure, supported by said main supporting structure and formed by a rotating platform (112) supported by said main supporting structure and actuatable in a way to displace the strips applied in position and cut by said cutting means selectively in correspondence of any one of said trimming means, scraping means, and facing means; said means for supporting, transporting, and positioning the panels comprises a loading station (109) for a panel to be flanged, an unloading station (110) for the flanged panel, formed by suitable support surfaces, and roller units; said loading and unloading stations being situated in such a manner to determine in succession, by means of said supporting, transporting, and positioning means moved in a single feeding direction (B), the drawing of said panels from said loading station and the transport toward said rotating platform thereof, for performing the related machining steps by said applying means, said cutting means, said trimming means, said scraping means, and said facing means, and subsequently toward said unloading station for releasing and unloading the flanged panel, with subsequent return with an opposite movement of said supporting, transporting, and positioning means toward said loading station.

20. The machine according to claim 19 wherein said applying means comprise at least a powered rotating applying roller (123) actuated by a first drive unit thereof and at least a pressing roller (125) actuated by a second drive unit supported by said rotating platform, the distance of said rotating platform being adjustable with respect to said applying roller (123), depending on the different shapes of the panels.

21. The machine according to claim 20 wherein said rotating platform (112) is provided with the further operative means for performing additional machinings, when applying rubberized covering strips for rounding off the edges.

22. The machine according to claim 19, said spool being pivoted by means of a stud (128) located on said rotating platform, in such an inclined position as to permit said covering strip to be guided toward said applying means and entrained temporarily toward it by said powered means (129).

* * * * *